United States Patent [19]
Miyamae et al.

[11] Patent Number: 5,299,200
[45] Date of Patent: Mar. 29, 1994

[54] ADAPTIVE INTERFACE THAT AUTOMATICALLY ADJUSTS FOR TIMING SKEWS CAUSED BY SIGNAL DELAYS

[75] Inventors: Futoshi Miyamae, Tenri; Manabu Onozaki, Nara; Daisuke Azuma, Soraku, all of Japan

[73] Assignee: Sharp Kabushiki Kaisha, Osaka, Japan

[21] Appl. No.: 871,544

[22] Filed: Apr. 21, 1992

[30] Foreign Application Priority Data

Apr. 26, 1991 [JP] Japan .................................. 3-97657

[51] Int. Cl.⁵ .............................................. H04J 3/06
[52] U.S. Cl. .................................. 370/100.1; 370/94.1
[58] Field of Search ................... 370/94.1, 94.3, 85.6, 370/85.2, 60, 67, 85.1, 85.15, 100.1; 340/825.5, 525.51

[56] References Cited

U.S. PATENT DOCUMENTS 4,935,922  6/1990  Wicklund et al. ................. 370/94.1
4,985,890  1/1991  Matsumoto et al. ............... 370/94.1
5,008,880  4/1991  Azuma .............................. 370/94.1

Primary Examiner—Douglas W. Olms
Assistant Examiner—Ajit Patel

[57] ABSTRACT

An interface system for controlling data transmission from a first information processing unit to a second information processing unit includes a handshaking type data transmission path. The handshaking type data transmission path includes a first interface circuit and a second interface circuit. A transmission signal output from the first information processing unit passes the first interface circuit, is then waveform-shaped by the second interface circuit and applied to the second information processing unit. A transmission acknowledging signal output from the second information processing unit passes the first interface circuit and is applied to the first information processing unit. Thus, the timing skews of the signals in the data transmission paths between the first and second information processing units can autonomously be adjusted, thereby preventing further transmission of a transmission signal.

7 Claims, 9 Drawing Sheets

PULSE WIDTH
GATE DELAY FOR
SETTING PULSE WIDTH
(IN ODD NUMBER)

ADAPTIVE INTERFACE THAT AUTOMATICALLY ADJUSTS FOR TIMING SKEWS CAUSED BY SIGNAL DELAYS

BACKGROUND OF THE INVENTION

1. Cross-Reference to Related, Copending Application

Related, copending application of particular interest to the instant application is U.S. Ser. No. 497,221, entitled "Data Transmission Apparatus", filed Mar. 22, 1990 and assigned to the same assignee of the instant application.

2. Field of the Invention

The present invention relates generally to interface apparatuses, and more specifically, to an interface apparatus controlling data transmission from a first apparatus to one or a plurality of second apparatuses.

3. Description of the Background Art

Handshaking type data transfer is conventionally known as data transfer in an information processing unit or the like. Data transfer from a first data transmission path to a second data transmission path by means of such handshaking type data transmission is, for example, conducted as follows.

Transmission signals are supplied from the first data transmission path to the second data transmission path, and transmission acknowledging signals are supplied from the second data transmission path to the first data transmission path. Data is supplied from the first data transmission path to the second data transmission path together with the transmission signals. The second transmission line, in response to the transmission signals, causes the transmission acknowledging signals to be inhibited in order to inhibit sending of further data for a fixed time period. After the elapse of the fixed time period, when the transmission acknowledging signals return to the authorized state data transmission from the first data transmission path to the second data transmission path is once again authorized. In this manner, the handshaking type data transmission is performed within an information processing unit or a plurality of information processing units.

When data transmission is conducted between a plurality of apparatuses, long signal lines for connecting these apparatuses to each other result in delay in signal transmission. As a result, some time period is required after data is supplied from the first apparatus to the second apparatus together with the transmission signals until the first apparatus receives a signal inhibiting sending of further data. Further data is therefore sent from the first apparatus to the second apparatus before reception of the data by the second apparatus is complete.

Furthermore, in data transmission from one apparatus to a plurality of apparatuses, if interconnection paths connected between these apparatuses are different in length every interconnection path will have a different signal delay time. Consequently, a delay circuit including a gate element or a delay circuit including a resistor or a capacitance element should be additionally provided in each path, in order to adjust timing skews of signals in the plurality of interconnection paths. The interconnection paths between the apparatuses usually change depending upon the placements of the apparatuses upon their actual installation, and, therefore, skew adjustment as described above will be necessary depending upon actual conditions for installing such a plurality of apparatuses.

Furthermore, when the transmission signals are transmitted in a form of pulse wave, depending upon the input load of the second apparatus which is subject to interface, a decrease in pulse width or a loss of pulse is effected due to lack of driving capability in the final stage of the first apparatus, or external noise comes in. This can cause the second apparatus to operate erroneously in data transmission.

SUMMARY OF THE INVENTION

It is an object of the present invention, in an interface apparatus controlling data transmission from a first apparatus to one or a plurality of apparatuses, to adjust autonomously timing skews created by signal delays in interconnection paths between the apparatuses, and reduce effects upon transmission signals caused by loads in transmission lines between the apparatuses.

Briefly stated, an interface apparatus in accordance with the present invention controls data transmission from a first apparatus to one or a plurality of second apparatuses. The apparatus includes a transmission inhibiting signal generation portion, a state signal holding portion and a transmission acknowledging signal generation portion. The first apparatus outputs to the interface apparatus a first state signal for indicating the transmission state of data when data is sent to the one or plurality of second apparatuses. Each of the one or plurality of second apparatuses outputs to the interface apparatus a second state signal indicating the state of reception completion when the reception of the data from the first apparatus is complete. The transmission inhibiting signal generation portion, in response to the first state signal from the first apparatus, applies a transmission inhibiting signal for inhibiting sending of further data to the first apparatus. The state signal holding portion, in response to the second state signal from the one or plurality of second apparatuses, holds the first state signal and outputs the held first state signal to the one or plurality of second apparatuses. The transmission acknowledging signal generation portion, in response to the second state signal generated at the latest point among the second state signals from the one or plurality of second apparatuses, applies to the first apparatus a transmission acknowledging signal acknowledging transmission of further data in place of the transmission inhibiting signal.

In operation, the transmission inhibiting signal generation portion, in response to the first state signal from the first apparatus, applies a transmission inhibiting signal to the first apparatus. This prohibits the first apparatus from transmitting further data to the one or plurality of second apparatuses. The state signal holding portion, in response to the second state signal from the second apparatus, holds the first state signal and outputs the held first state signal to the second apparatus. This prevents the first state signal from being lost, and, therefore, the first apparatus can maintain the transmission state of data as far as the second state signal is input. The transmission acknowledging signal generation portion, in response to the second state signal generated last from the one or plurality of second apparatuses, applies a transmission acknowledging signal to the first apparatus. This allows the second apparatus to receive further data. It is therefore possible to adjust autonomously the timing skews of signals in the interconnection parts between the first apparatus and the one or plurality of second apparatuses.

In another aspect of the present invention, the state signal holding portion includes a waveform shaping portion for shaping the waveform of the first state signal into such a waveform that the second apparatus can receive the signal.

When the state signal holding portion includes the waveform shaping portion, the waveform of the first state signal is shaped by the waveform shaping portion so that the second apparatus can receive the signal. This prevents decrease in pulse widths of the transmission signals from the first apparatus to the second apparatuses, loss of pulse, and the effects of external noises. The second apparatus does not therefore erroneously operate, accurate data reception can be conducted, and a reception completion signal can be generated when the reception is complete.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A detailed description of embodiments of the present invention follows in conjunction with the drawings.

Figure 1:
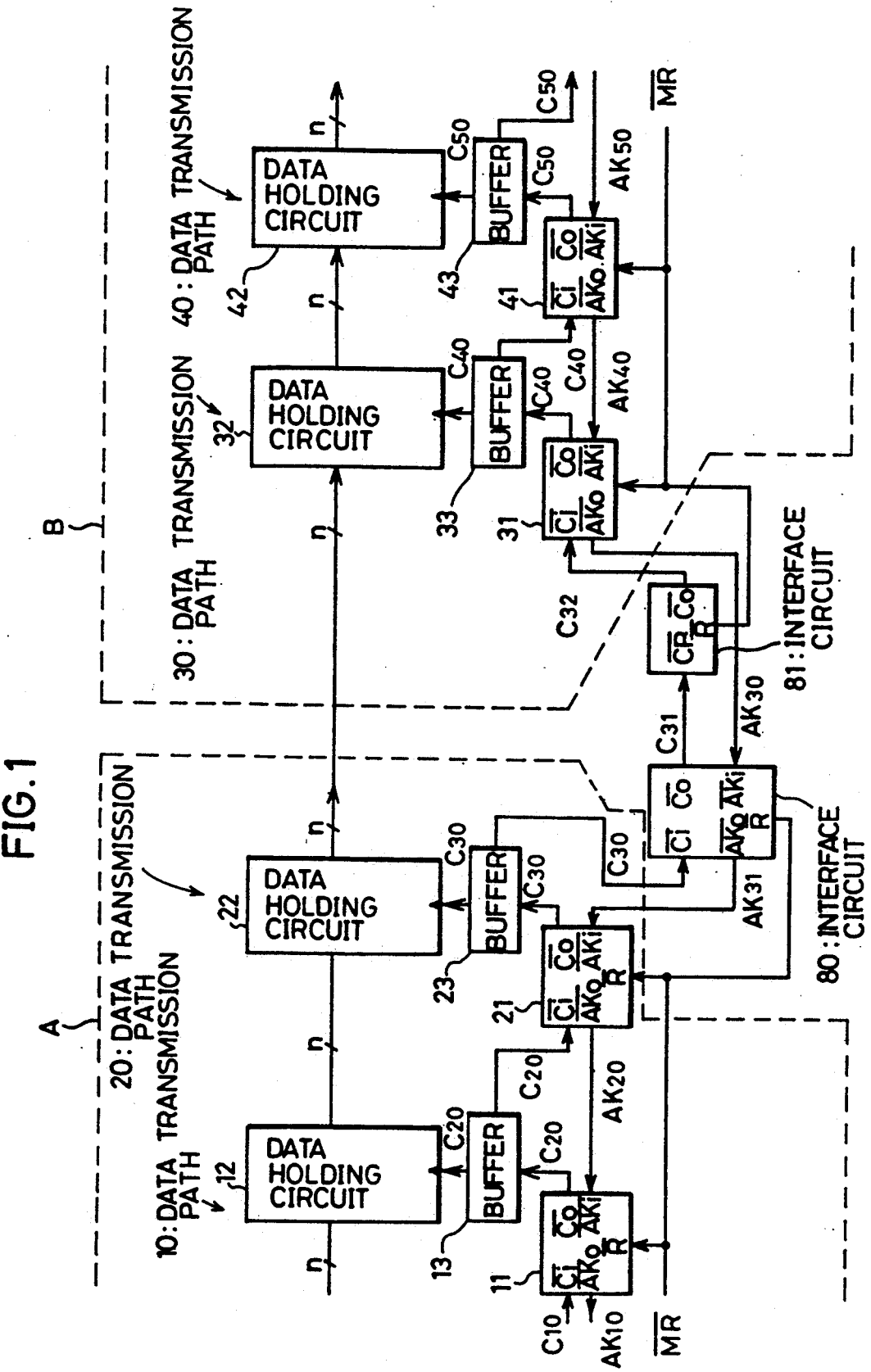
FIG. 1 is a block diagram showing a structure of an interface apparatus in accordance with one embodiment of the present invention.

FIG. 1 is a block diagram showing a structure of an interface apparatus in accordance with one embodiment of the present invention. The interface apparatus shown in FIG. 1 controls data transmission between a first information processing unit A and a second information processing unit B.

In FIG. 1, first information processing unit A includes data transmission paths 10 and 20. Data transmission path 10 is formed of a transmission control portion 11, a data holding circuit 12 and a buffer 13. Data transmission path 20 is formed of a transfer control portion 21, a data holding circuit 22 and a buffer 23. Second information processing unit B includes data transmission paths 30 and 40. Data transmission path 30 is formed of a transfer control portion 31, a data holding circuit 32 and a buffer 33. Data transmission path 40 is formed of a transfer control portion 41, a data holding circuit 42, and a buffer 43. An interface circuit 80 is connected to transfer control portion 21 in data transmission path 20. An interface circuit 81 is provided between interface circuit 80 and transfer control portion 31.

Data applied from the preceding portion (not shown) to data holding circuit 12 is transmitted to data holding circuit 22. The data transmission from data holding circuit 12 to data holding circuit 22 is controlled by transfer control portion 11. The data received by data holding circuit 22 is transmitted to data holding circuit 32. The data transmission from data holding circuit 22 to data holding circuit 32 is controlled by transfer control portion 21, and interface circuits 80 and 81. The data received by data holding circuit 32 is transmitted to data holding circuit 42. The data transmission from data holding circuit 32 to data holding circuit 42 is controlled by transfer control portion 31. The data received by data holding circuit 42 is transmitted to the succeeding stage (not shown). The data transmission from data holding circuit 42 to the succeeding stage is controlled by transfer control portion 41. The data transmission in this embodiment is data of n bits.

A transmission signal C10 is applied from the preceding stage to transfer control portion 11. In response to a rise of the transmission signal C10, data is applied from the preceding portion to data holding circuit 12. Transfer control portion 11 applies to the preceding stage a transmission acknowledging signal AK10 of "L" level. The transmission acknowledging signal AK10 of "L" level indicates a transmission inhibited state. With a transmission acknowledging signal AK20 of "H" level being applied from transfer control portion 21, transfer control portion 11 applies a transmission signal C20 of "L" level to data holding circuit 12 and transfer control portion 21 through buffer 13. The transmission acknowledging signal AK20 of "H" level indicates a transmission acknowledged state. Data holding circuit 12, in response to a fall of the transmission signal C20, latches the data applied from the preceding stage and outputs the same.

Then, transfer control portion 21, with a transmission acknowledging signal AK31 of "H" level being applied from interface circuit 80, in response to the fall of the transmission signal C20, applies a transmission signal C30 of "L" level to data holding circuit 22 through buffer 23, and to transfer control portion 31 through a path in the order of buffer 23, interface circuit 80, and interface circuit 81. Data holding circuit 22, in response to a fall of the transmission signal C30, latches the data applied from data holding circuit 12 and outputs the same. Transfer control portion 31, with a transmission acknowledging signal AK40 of "H" level being applied from transfer control portion 41, in response to the fall of a transmission signal C32 applies a transmission signal C40 of "L" level to data holding circuit 32 and transfer control portion 41 through buffer 33. Data holding circuit 32, in response to a fall of the transmission signal C40, latches the data applied from data holding circuit 22 and outputs the same. Similarly, the data applied to data holding circuit 42 is transmitted to the succeeding stage.

The transmission signal C30 from transfer control portion 21 is applied to the transmission signal input terminal/Ci of interface circuit 80 through buffer 23. The transmission acknowledging signal AK30 is applied from transfer control portion 31 to the transmission acknowledging signal input terminal/AKi of interface circuit 80. When the transmission signal C30 applied from transfer control portion 21 is pulled down to the "L" level, interface circuit 80 latches the "L" level in response to the fall, and makes the transmission signal C31 attain the "L" level. Interface circuit 80 thereafter pulls the transmission acknowledging signal AK31 to be applied to transfer control portion 21 to the "L" level (the inhibited state). The transmission signal C31 attains the "H" level when the AK30 attains the "L" level. When the transmission signal C30 and transmission acknowledging signal AK30 are both pulled up to the "H" level, the transmission acknowledging signal AK31 attains the "H" level (the transmission acknowledged state). When the transmission signal C30 rises in this state, data is transmitted from data holding circuit 22 to data holding circuit 32 in response to the rise.

The transmission signal C31 from interface circuit 80 is applied to the transmission signal input terminal/Cp of interface circuit 81. When the transmission signal C31 attains the "L" level, a pulse wave of a prescribed time width (a transmission signal C32) is generated in response to the fall. The transmission signal C32 is a signal formed by shaping the pulse width/amplitude of the transmission signal C31. The transmission signal C32 is applied to transfer control portion 31 through an output terminal/Co. Thus providing interface circuit 80 between transfer control portion 21 and interface circuit 81 makes it possible to prevent decrease in the pulse widths of the transmission signals, a loss of a transmission signal, and the effects of external noises upon the transmission signals.

Transfer control portion 31, in response to a rise of the transmission signal C32, pulls the transmission acknowledging signal AK30 to be applied to interface circuit 80 down to the "L" level, and after the elapse of a prescribed time period, pulls the transmission acknowledging signal AK30 up to the "H" level (the authorized state). Interface circuit 80, in response to the rise of the transmission acknowledging signal AK30, pulls the transmission acknowledging signal AK31 to be applied to transfer control circuit 21 to the "H" level (the authorized state). Thus, further data transmission from data holding circuit 22 to data holding circuit 32 is permitted.

As described above, in the embodiment shown in FIG. 1, further data transmission is inhibited from first information processing unit A to second information processing unit B until the data transmission from first information processing unit A to the second information processing unit B is complete.

Figure 2:
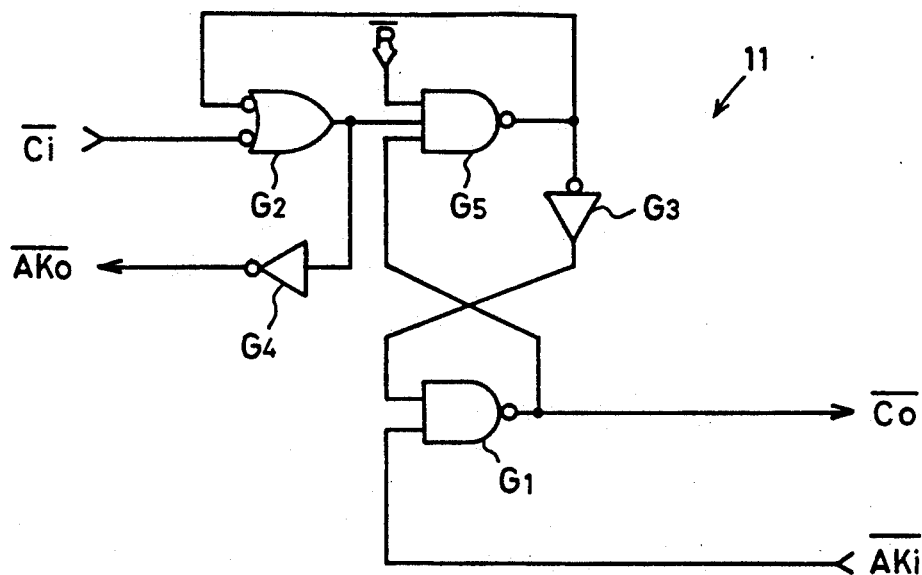
FIG. 2 is a circuit diagram showing a structure of a transfer control portion included in FIG. 1.

FIG. 2 illustrates in detail a circuit configuration of transfer control portion 11.

As shown in FIG. 2, transfer control portion 11 includes NAND gates G1, G2, inverters G3, G4, and an NAND gate G5. The transmission signal C10 is applied to the transmission signal input terminal/Ci from the preceding stage (not shown), while the transmission acknowledging signal AK10 is output from the transmission acknowledging signal output terminal/AKO. The transmission signal C20 is output from transmission signal output terminal/CO, and the transmission acknowledging signal AK20 is applied from transfer control portion 21 of the succeeding stage (FIG. 1) to the transmission acknowledging signal input terminal/AKi.

Figure 3:
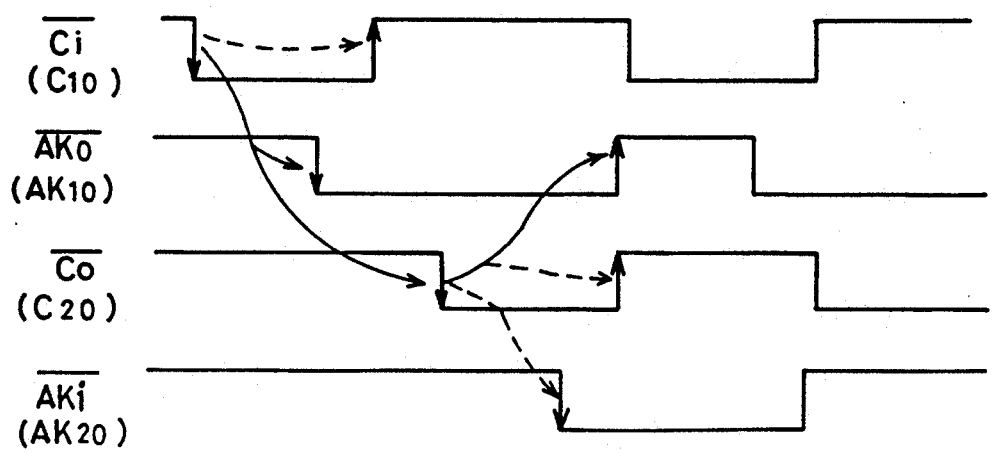
FIG. 3 is a timing chart for illustrating transfer by a transfer control portion when a data transmission path in the succeeding stage is vacant.
Figure 4:
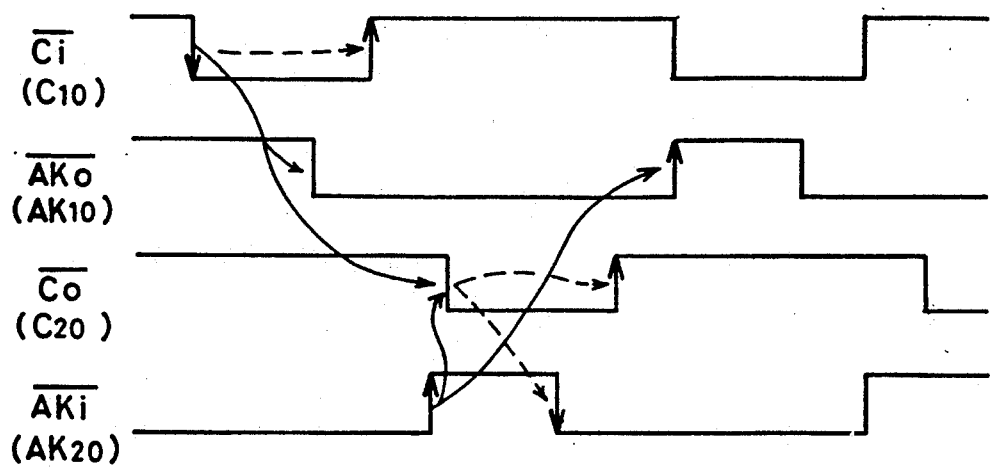
FIG. 4 is a timing chart for illustrating an operation of a data transfer control portion when a data transmission path in the succeeding stage is stuffed.

A description of the operation of transfer control portion 11 shown in FIG. 2 will be provided in conjunction with timing charts shown in FIGS. 3 and 4.

FIG. 3 is a timing chart for illustrating the operation when a data transmission path of the succeeding stage is vacant.

When the data transmission path of the succeeding stage is vacant, the transmission acknowledging signal AK20 of "H" level is applied from the transfer control portion of the succeeding stage. This makes transmission acknowledging signal input terminal/AKi attain the "H" level. When the transmission acknowledging signal AK10 applied from the preceding stage is pulled down to the "L" level, the potential of transmission signal input terminal/Ci changes to the "L" level. This causes the output of NAND gate G2 to attain the "H" level. This causes the output of inverter G4 to attain the "L" level, and the transmission acknowledging signal AK10 output from transmission acknowledging signal output terminal/AKO is pulled down to the "L" level. On the other hand the output of NAND gate G5 attains "L" level, and the output of inverter G3 attains the "H" level. At that time, with the potential of transmission acknowledging signal input terminal/AKi being at the "H" level, the output of NAND gate G1 is pulled down to the "L" level. This causes the transmission signal C20 output from transmission signal output terminal/CO to be pulled down to the "L" level.

Transfer control portion 21 of the preceding stage (FIG. 1) receiving the transmission signal C20, in response to a fall of the transmission signal C20, pulls the transmission acknowledging signal AK20 applied to transfer control portion 11 down to the "L" level. The potential of transmission acknowledging signal input terminal/AKi of transfer control portion 11 is pulled down to the "L" level. Meanwhile in response to the fall of the output of NAND gate G1 to the "L", the output of NAND gate G5 is pulled to "H" level, and the output of inverter G3 to the "L" level. This causes the output of NAND gate G1 to once again attain the "H" level. Thus, the transmission signal C20 is once again pulled up to the "H". As described above, after being pulled down to the "L" level, the transmission signal C20 is pulled up to the "H" level after the elapse of a prescribed time period.

The transmission signal C10 applied from the preceding stage is pulled up to the "H" level after the elapse of a prescribed time period. This causes the output of NAND gate G2 to attain the "L" level, and the output of inverter G4 to attain the "H" level. This causes the transmission acknowledging signal AK10 to once again rise to the "H" level.

As in the foregoing, when the transmission acknowledging signal AK20 applied from the transmission control portion of the succeeding stage is in the authorized state (the "H" level), the transmission acknowledging signal AK10 applied to the preceding stage attains the inhibited state (the "L" level) in response to the fall of the transmission signal C10 applied from the preceding stage, and after the elapse of a prescribed time period, the transmission signal C20 applied to the transfer control portion of the succeeding stage is pulled down to the "L" level. In response to the fall of the transmission signal C20, data applied to the input terminal of data holding circuit 12 (FIG. 1) is latched and output from the output terminal. In other words, data transmission is conducted from data transmission path 10 to data transmission path 20.

FIG. 4 is a timing chart for illustrating the operation when the data transmission path of the succeeding stage is occupied.

The transmission acknowledging signal AK20 applied from the transfer control portion of the succeeding stage is at the "L" level. When the transmission output signal C10 applied from the preceding stage is pulled down to the "L" level, the output of NAND gate G2 attains the "H" level, and the output of inverter G4 is pulled down to the "L" level. This causes the transmission acknowledging signal AK10 output from the transmission acknowledging signal output terminal-/AKO to attain the "L" level. When the transmission acknowledging signal AK20 applied from the transfer control portion of the succeeding stage is at the "L" level (the inhibited state), the output of NAND gate G1 is at the "H" level. The transmission output signal C20 applied to transfer control portion 21 of the succeeding stage therefore maintains its "H" level as far as the transmission acknowledging signal AK20 is at the "L". Therefore, data is not transmitted from data transmission path 10 to data transmission path 20 (see FIG. 1).

When the transmission acknowledging signal AK20 applied from the transfer control portion of the succeeding stage is pulled up to the "H" level, the output of NAND gate G1 is pulled down to the "L" level. This causes the transmission output signal C20 applied to the transfer control portion of the succeeding stage to attain the "L" level. In response to the fall of the transmission signal C20, data applied to data holding circuit 12 is latched and output (see FIG. 1).

The transfer control portion of the succeeding stage, in response to the fall of transmission signal C20 applied from transfer control portion 11, after the elapse of a fixed time period, pulls the transmission acknowledging signal AK20 applied to data control portion 11 to the "L" level. In response to the fall of the transmission acknowledging signal AK20 applied from the transfer control portion of the succeeding stage, after the elapse of a fixed time period, the transmission acknowledging signal AK10 applied to the preceding stage is pulled up to the "H" level.

As described above, when the transmission acknowledging output signal AK20 applied to the transfer control portion of the succeeding stage is at the inhibited state ("L" level), the transmission signal C20 to be applied to transfer control portion of the succeeding stage is not pulled down to the "L" level. In other words, when data transmission path 20 of the succeeding stage is busy, data is not transmitted from data transmission path 10 to data transmission path 20.

The structures of transfer control portions 21, 31, and 41 are similar to those shown in FIG. 2.

Figure 5:
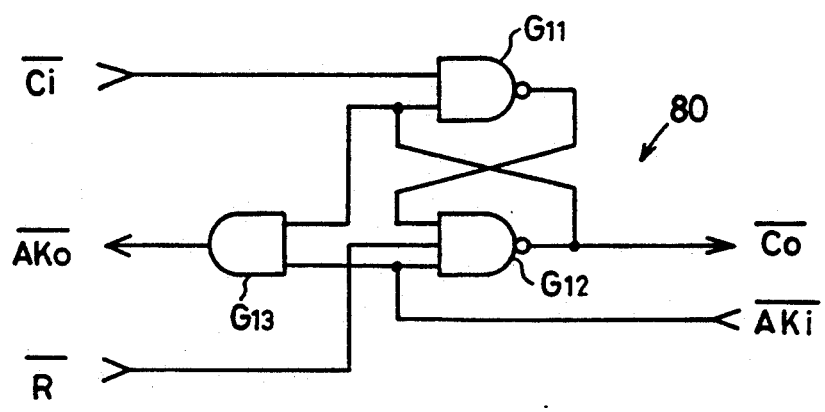
FIG. 5 is a circuit diagram showing a structure of interface circuit 80 shown in FIG. 1.

FIG. 5 is a circuit diagram showing the structure of interface circuit 80 shown in FIG. 1.

Interface circuit 80 includes NAND gates G11, G12 and an AND gate G13. Transmission acknowledging signal input terminal/AKi which receives the transmission acknowledging signal AK30 is connected to one input terminal of NAND gate G12 and one input terminal of AND gate G13. A reset terminal/R which receives a master reset signal/MR is connected to the other input terminal of NAND gate G12. The output terminal of NAND gate G12 is connected to a transmission signal output terminal/CO, one input terminal of NAND gate G11, and the other input terminal of AND gate 13. A transmission signal input terminal/Ci which receives the transmission signal C31 is connected to the other input terminal of NAND gate G11. The output terminal of AND gate 13 is connected to transmission acknowledging signal output terminal/AKO. Transmission acknowledging signal output terminal/AKO outputs the transmission acknowledging signal AK31.

Figure 6:
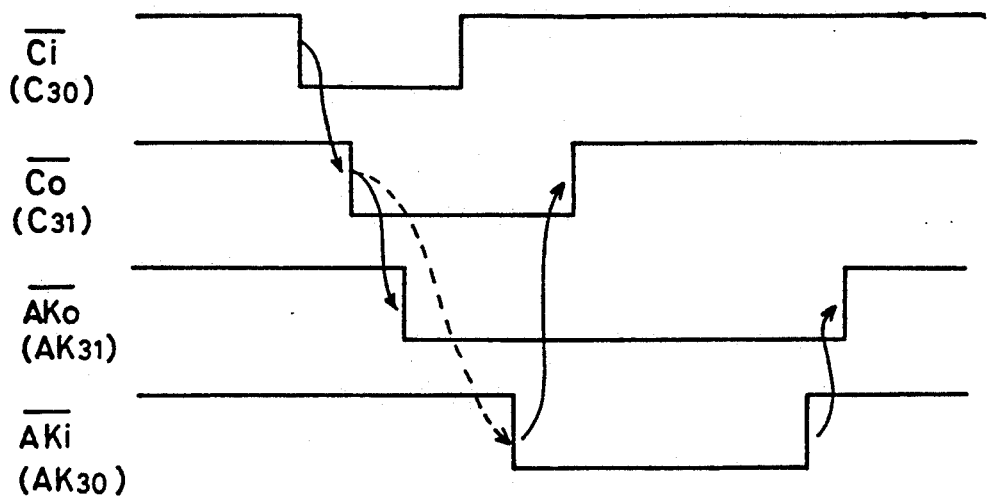
FIG. 6 is a timing chart for illustrating an operation of interface circuit 80 shown in FIG. 5.

A description of the interface circuit shown in FIG. 5 will be provided in conjunction with the timing chart of FIG. 6.

NAND gates G11, G12 latch the fall of the transmission signal C30 applied from transfer control portion 21 (FIG. 1) and causes the transmission signal C31 to attain the "L" level. When the transmission signal C31 is pulled to the "L" level, the transmission acknowledging signal AK31 output from AND gate G13 is pulled down to the "L" level (the inhibited state). When the transmission acknowledging signal AK30 applied from transfer control portion 31 (FIG. 1) is pulled down to the "L" level (the inhibited state), the transmission signal C31 output from NAND gate G12 attains the "H" level in response to the fall. Then, the transmission acknowledging signal AK30 is pulled up to the "H" level (the authorized state). In response to the rise of the transmission acknowledging signal AK30, the transmission acknowledging signal AK31 output from AND gate G13 rises to the "H" level (the authorized state).

As in the foregoing, interface circuit 80, in response to the rise of the transmission signal C30 applied from transfer control portion 21, causes the transmission acknowledging signal AK31 applied to transmission control portion 21 to attain the "L" level, and holds the transmission acknowledging signal AK31 at the "L" level until the transmission acknowledging signal AK30 applied from transfer control portion 31 rises to the "H" level. Maintaining the transmission state and reception state makes it possible to prevent decrease in the pulse widths of transmission signals, a loss of a transmission signal and the effects of external noises. As a result, transfer control portion 31 can latch the fall of the transmission signal C32 accurately, and transmission timings for transmission acknowledging signals can be accurately controlled.

Figure 7:
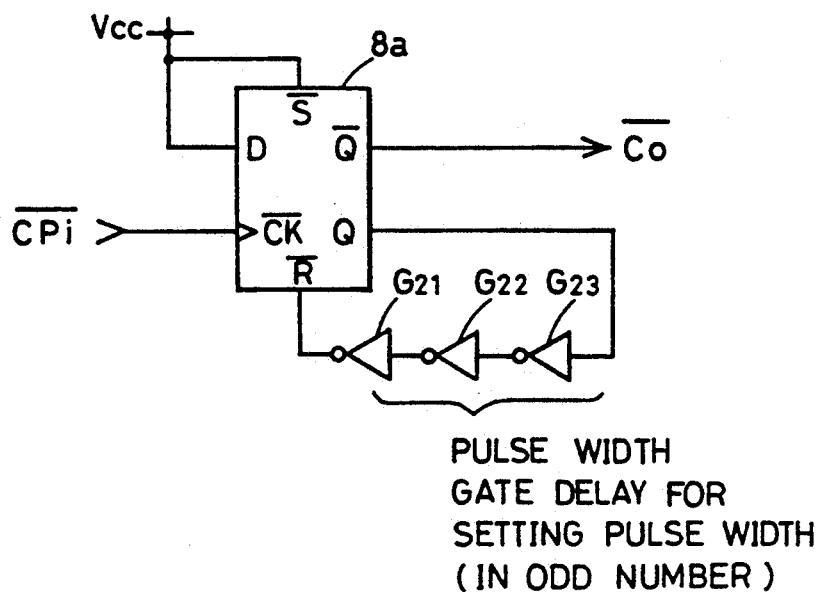
FIG. 7 is a circuit diagram showing a structure of interface circuit 81 shown in FIG. 1.

FIG. 7 is a circuit diagram showing the structure of interface circuit 81 shown in FIG. 1.

Interface circuit 81 includes a D type flipflop 8a, and inverters G21, G22 and G23. The/Cpi which receives the transmission signal C31 is connected to the clock input terminal/CK of D type flipflop 8a. The output terminal/Q of D type flipflop 8a is connected to a transmission signal output terminal/CO. Inverters G21, G22 and G23 are connected in series between output terminal Q and reset terminal/R. The pulse width of the transmission signal to be shaped is determined by the number of the inverters. The input terminal D of D type flipflop 8a and a set terminal/S are provided with a power supply voltage Vcc.

A description of an operation of interface circuit 81 in conjunction with FIG. 7 follows.

When the transmission signal C31 at the "L" level is applied from interface circuit 80, D type flipflop 8a, in response to the fall, latches the fall and pulls down the transmission signal C32 to the "L" level. A signal output from the output terminal Q of D type flipflop 8a attains an "H" level, the "H" level signal is delayed at inverters G21, G22 and G23, and then applied to the reset terminal/R of D type flipflop 8a. D type flipflop 8a is reset by the fall of the delayed signal, and, therefore, the transmission signal C32 rises. The waveform of the transmission signal C32 is thus shaped.

Figure 8:
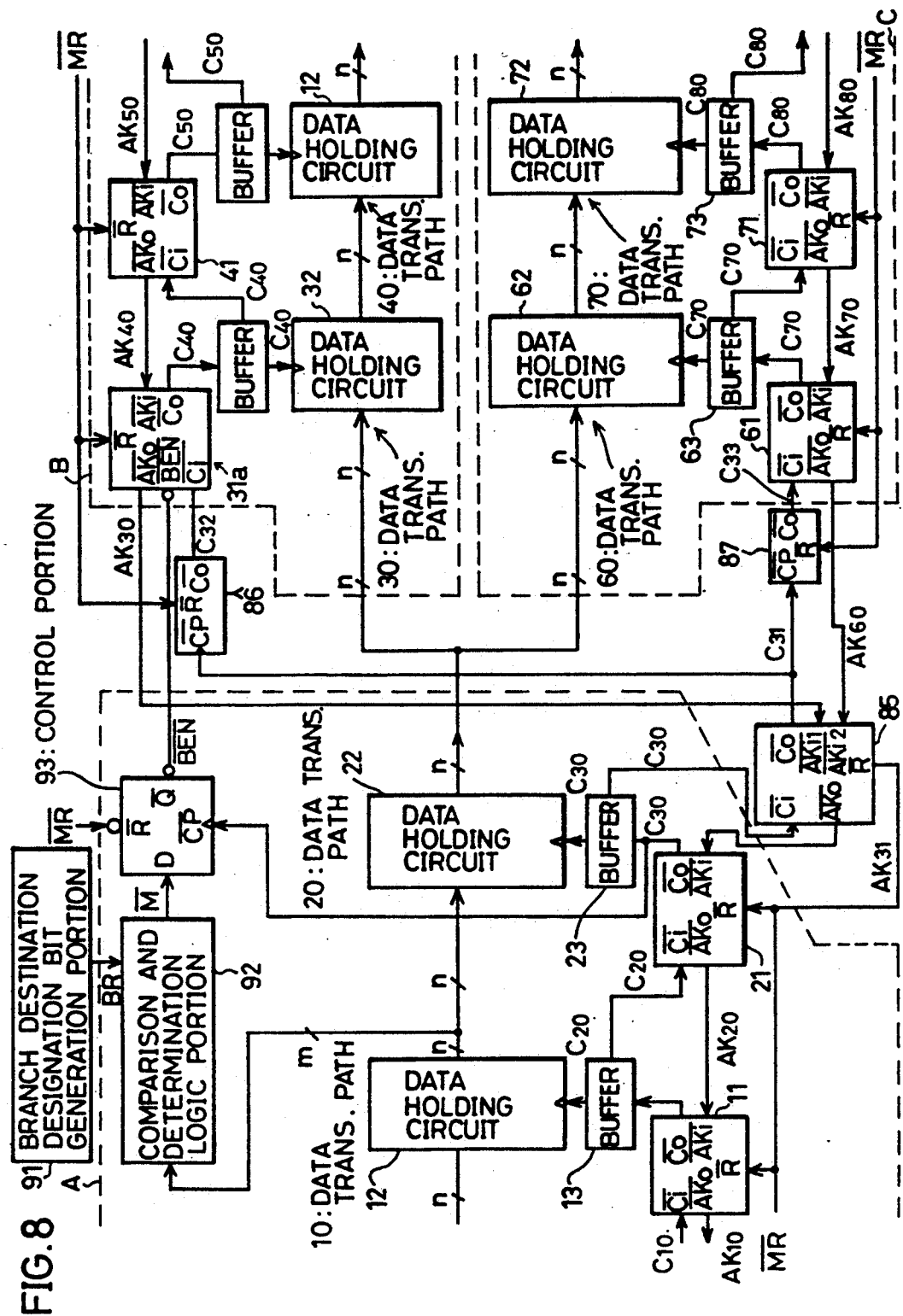
FIG. 8 is a block diagram showing a structure of an interface apparatus in accordance with another embodiment of the present invention.

FIG. 8 is a block diagram showing a structure of an interface apparatus in accordance with another embodiment of the present invention. The interface apparatus in accordance with the embodiment shown in FIG. 8 controls data transmission from first information processing unit A to second information processing unit B and third information processing unit C.

First information processing unit A includes data transmission paths 10 and 20. The structures of data transmission paths 10 and 20 are similar to those shown in FIG. 1. Information processing unit B includes data transmission paths 30 and 40. Data transmission path 30 is provided with a transfer control portion 31a instead of transfer control portion 31 shown in FIG. 1. The other structure of data transmission path 30 and the structure of data transmission path 40 are similar to those shown in FIG. 1. Third information processing unit C includes data transmission paths 60 and 70. Data transmission paths 60 is formed of a transfer control portion 61, a data holding circuits 62 and a buffer 63, and data transmission path 70 is formed of a transfer control portion 71, a data holding circuit 72 and a buffer 73. The structures of transfer control portions 61 and 71 are similar to those of transfer control portion 11 shown in FIG. 2. In this embodiment, an interface circuit 85 is provided in place of interface circuit 80 shown in FIG. 1, and an interface circuit 86 and an interface circuit 87 are provided in place of interface circuit 81.

Data applied from the preceding stage (not shown) to data holding circuit 12 is transmitted to data holding circuit 22. The data received by data holding circuit 22 is transmitted only to data holding circuit 62 or transmitted both data holding circuit 32 and data holding circuit 62.

Figure 9:
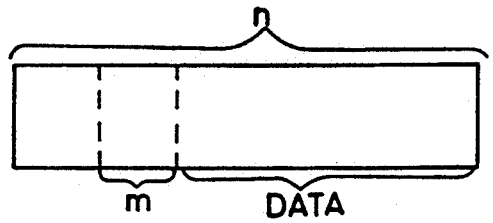
FIG. 9 is a diagram showing a structure of packet data transmitted in the embodiment shown in FIG. 8.

The data transmitted in the present embodiment is packet data of n bits as shown in FIG. 9. The packet data includes an identifier of m bits. The identifier indicates that the packet data should be transferred whether only to third information processing unit C, or to both second information processing unit B and third information processing unit C. First information processing unit A is further provided with a branching destination specifying bit generation portion 91, a comparison and determination logic portion 92 formed of a comparator, and a control portion 93 formed of a D type flipflop. Transfer control portion 11 is supplied with the transmission signal C10 from the preceding portion. In response to a fall of the transmission signal C10, the packet data is provided to data holding circuit 12 from the preceding portion. Transfer control portion 11 applies the transmission acknowledging signal AK10 of the "L" level (inhibited state) to the preceding portion. When the transmission acknowledging signal AK20 of the "H" level (authorized state) is supplied from transfer control portion 21, transfer control portion 11 applies the transmission signal C20 of the "L" level to both data holding circuit 12 and transfer control portion 21 through buffer 13. Data holding circuit 12, in response to the fall of the transmission signal C20, latches the packet data provided from the preceding portion and outputs the same.

Meanwhile, branching destination specifying bit generation portion 91 is previously set so as to generate a prescribed branching destination specifying bit BR. Comparison and determination logic portion 92 compares the identifier included in the packet data output from data holding circuit 12 to the branching destination specifying bit BR applied from branching destination specifying bit generation portion 91, and outputs a match signal/$\overline{M}$ of an "L" if a match is found between them, and a match signal/$\overline{M}$ of an "H" level if there is not any match found. The match signal is applied to the input terminal D of control portion 93.

The transmission signal C20 from transfer control portion 21 is applied to the clock signal input terminal/CP of control portion 93. Control portion 93, in response to a fall of the transmission signal C20, outputs the inversion of the match signal/$\overline{M}$ applied to input terminal/D as a control signal/$\overline{BEN}$ from an inversion output terminal/Q.

If the control signal/$\overline{BEN}$ is at an "H" level, transfer control portion 31a does not accept any transmission signal from interface circuit 86. Transfer control portion 31a accepts the transmission signal C32 only when the control signal/$\overline{BEN}$ is at an "L" level. More specifically, when the identifier included in the packet data matches the branching destination specifying bit BR, data holding circuit 22 transmits data only to data holding circuit 62.

Then, when the transmission acknowledging signal AK31 of the "H" level is applied from interface circuit 85, transfer control portion 21, in response to a fall of the transmission signal C20, applies the transmission signal C30 of the "L" level to data holding circuit 22 through buffer 23. Transfer control portion 21 applies the transmission signal C30 in a path in the order of buffer 23, interface circuit 85, and interface circuit 86 to the input of transfer control portion 31a, while applies the same signal to transfer control portion 61 in a path in the order of buffer 23, interface circuit 85, and an interface circuit 87. Data holding circuit 22, in response to a fall of the transmission signal C30, latches the packet data applied from data holding circuit 12 and outputs the same.

When the control signal/$\overline{BEN}$ is at the "H" level, the packet data output from data holding circuit 22 is applied only to data holding circuit 62. This operation is referred to as branching. Transfer control portion 61, in response to a fall of the transmission signal C33, applies a transmission signal C70 of an "L" level to data holding circuit 62 and transfer control portion 71 through a buffer 63. Data holding circuit 62, in response to the fall of the transmission signal C70, latches the packet data applied from data holding circuit 22 and outputs the same. At that time, with the control signal/$\overline{BEN}$ being held at the "H" level, the packet data output from data holding circuit 22 is applied only to data holding circuit 62. The packet data output from data holding circuit 62 is similarly latched by data holding circuit 72 and output therefrom.

Conversely, when the control signal/$\overline{BEN}$ output from control portion 93 is at the "L" level, the packet data output from data holding circuit 22 is applied to both data holding circuit 32 and data holding circuit 62. This is called "shunt". The packet data applied to data holding circuit 32 is latched by data holding circuit 32 and output therefrom, and then further latched by data holding circuit 42 and output therefrom. Similarly, the packet data applied to data holding circuit 62 is latched by data holding circuit 62 and output therefrom, and then latched by data holding circuit 72 and output therefrom.

Interface circuit 85 latches a fall of the transmission signal C30 applied from transfer control portions 21, pulls the transmission signal C31 to the "L" level, and pulls up the transmission acknowledging signal AK31 to be applied to transfer control portion 21 to the "L" level (inhibited state). Thereafter, when either one of the transmission acknowledging signal AK30 applied from transfer control portion 31a and the transmission acknowledging signal AK60 applied from transfer control portion 61 falls to the "L" level, the transmission signal C31 is pulled up to the "H" level in response to the fall. Thereafter, when the transmission acknowledging signal AK30 applied from transfer control portion 31a and the transfer acknowledging signal AK60 applied from transfer control portion 61 are both pulled up to the "H" level, the transmission acknowledging signal AK31 to be applied to transfer control portion 21 is pulled up to the "H" level (authorized state).

Therefore, if time periods for transferring signals are different between the interconnection path between first information processing unit A and second information processing unit B, and the interconnection path between first information processing unit A and third information processing unit C, it is possible to adjust autonomously the timing skews of the signals in these interconnection paths.

Figure 10:
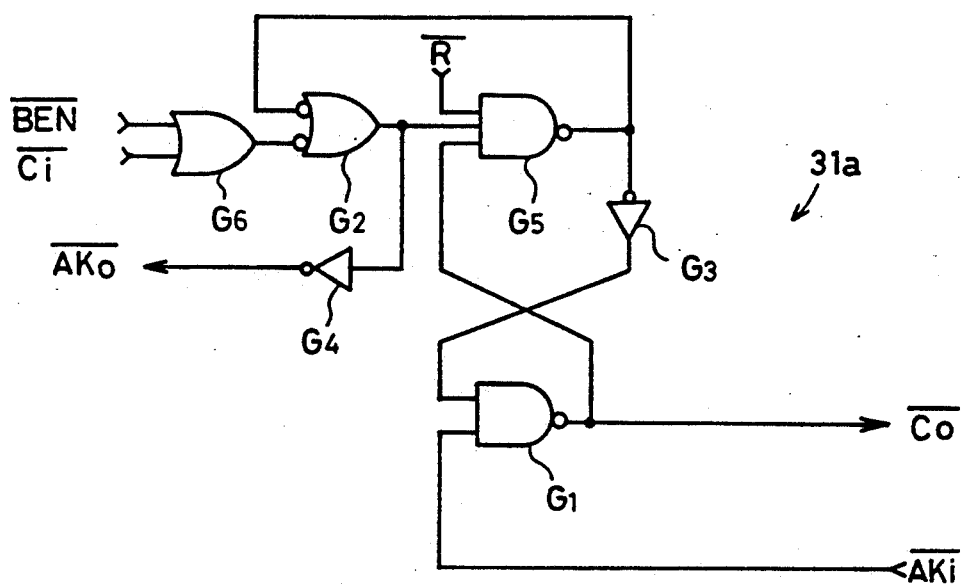
FIG. 10 is a circuit diagram showing a structure of the transfer control portion shown in FIG. 8.

FIG. 10 is a circuit diagram showing the structure of transfer control portion 31a shown in FIG. 8 in detail.

Transfer control portion 31a in FIG. 10 is further provided with an OR gate G6. One input terminal of OR gate G6 is connected to transmission signal input terminal/Ci, and the other input terminal is connected to control signal input terminal/BEN. The transmission signal C30 is supplied to transmission signal input terminal/Ci from transfer control portion 21 (FIG. 8). The control signal $\overline{BEN}$ is applied to control signal input terminal/BEN from control portion 93 (FIG. 8). The transmission acknowledging signal AK30 is output from transmission acknowledging signal output terminal/AKO. The transmission signal C40 is output from transmission signal output terminal/CO, and the transmission acknowledging signal AK40 is applied to transmission acknowledging signal input terminal/AKi from transfer control portion 41 (FIG. 8) of the succeeding stage. The structures of the other portions are similar to those in transfer control portion 11 shown in FIG. 1.

As for the operation of transfer control portion 31a shown in FIG. 10, the waveforms of the transmission signals C10 shown in FIGS. 3 and 4 correspond to the waveforms of the outputs of OR gate G6. When the signal $\overline{BEN}$ is at the "L" level, the operation shown in FIGS. 3 and 4 is therefore conducted.

Figure 11:
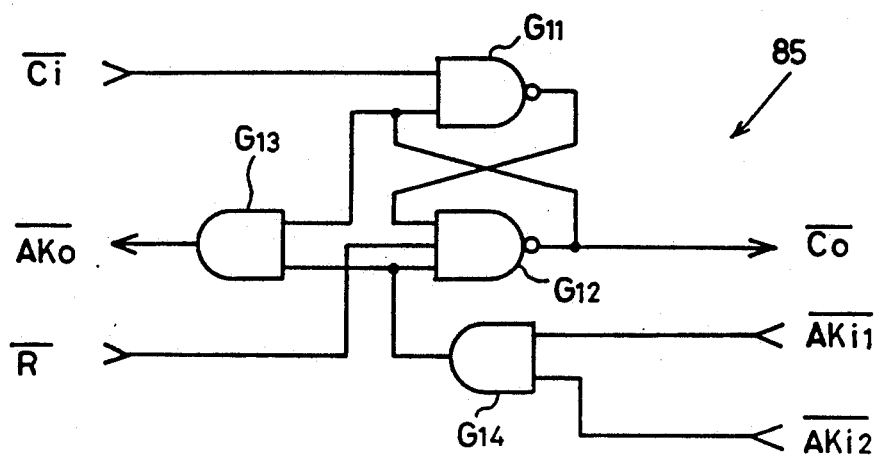
FIG. 11 is a circuit diagram showing a structure of interface circuit 80 shown in FIG. 8.

FIG. 11 is a circuit diagram showing in detail the structure of interface circuit 85 shown in FIG. 8.

The structure of interface circuit 85 shown in FIG. 11 is substantially identical to the structure of interface circuit 80 shown in FIG. 5 except for further provision of an AND gate G14.

One input terminal of AND gate G14 receives the transmission acknowledging signal AK30 applied from transfer control portion 31a (FIG. 8) and is connected to transmission acknowledging signal input terminal/AKi1, and the other input terminal receives the transmission acknowledging signal AK60 applied from transfer control portion 61 (FIG. 8) and is connected to transmission acknowledging signal value terminal/AKi2. The output terminal of AND gate G14 is connected to one input terminal of NAND gate G12 and one input terminal of AND gate G13.

A description of the operation of interface circuit 85 shown in FIG. 11 follows.

The circuit latches a fall of the transmission signal C30 applied from transfer control portion 21 (FIG. 8), and pulls the transmission signal C31 to the "L" level. In response to the fall of the transmission signal, the transmission acknowledging signal AK31 applied to transfer control portion 21 is pulled to the "L" level (inhibited state). The transmission acknowledging signal AK30 applied from transfer control portion 31a (FIG. 8) and the transmission acknowledging signal AK60 applied from transfer control portion 61 (FIG. 8) are pulled down to the "L" level. When transmission acknowledging signals AK30 and AK60 both attain the "H" level, the transmission acknowledging signal AK31 is pulled to the "H" level (authorized state).

Thus, interface circuit 85, in response to the fall of the transmission signal C30, pulls the transmission acknowledging signal AK31 to the "L" level, and pulls up the transmission acknowledging signal AK31 to the "H" level when the transmission acknowledging signal AK30 and the transmission acknowledging signal AK60 both attain the "H" level.

Transmission of further data from data holding circuit 22 to data holding circuits 32 and 62 is inhibited after a transmission of data to one or both of data holding circuit 32 and data holding circuit 62 from data holding circuit 22 until both of transfer control portions 31a and 61 are authorized to receive data.

Figure 12:
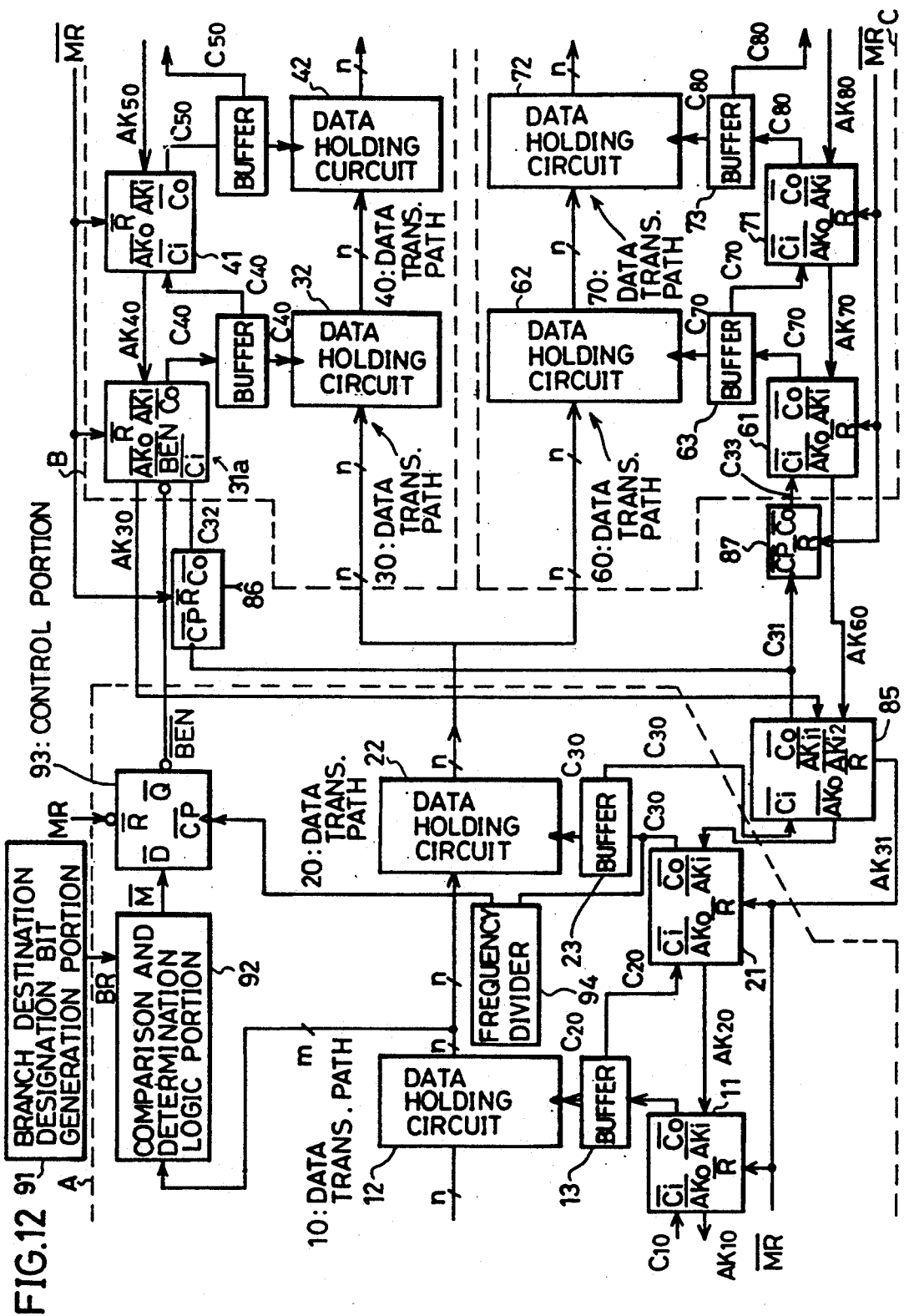
FIG. 12 is a block diagram showing a structure of an interface apparatus in accordance with another embodiment of the present invention.

FIG. 12 is a block diagram showing a structure of an interface apparatus in accordance with another embodiment of the present invention. The interface apparatus of the embodiment of FIG. 12 is substantially identical to the interface apparatus shown in FIG. 8 with a difference being that a frequency divider 94 is provided between transfer control portion 21 and control portion 93.

Figure 13:
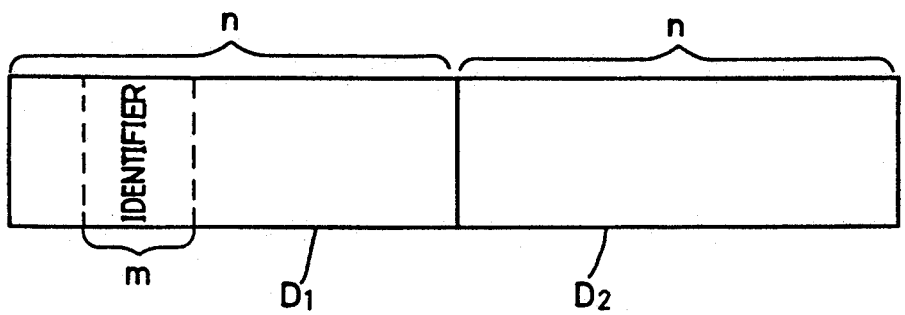
FIG. 13 is a block diagram showing a structure of packet data transmitted in the embodiment shown in FIG. 12.

The data transferred in the present embodiment is packet data formed of a first word D1 of n bits and a second word D2 of n bits as shown in FIG. 13. The first word D1 of packet data includes the identifier of m bits shown in FIG. 9.

Now, a description of the operation of the interface apparatus shown in FIG. 12 follows. Branching destination specifying bit generation portion 91 is set so as to generate a prescribed branching destination specifying bit BR. Comparison and determination logic portion 92 compares the identifier included in the first word of packet data and the branching destination bit BR, and outputs a match signal/$\overline{M}$ of an "L" level if a match is found, and a match signal/$\overline{M}$ of an "H" level if no match is found. A frequency divider 94 frequency-divides the transmission signal C30 applied from transfer control portion 21 by two and applies the frequency-divided signal to the clock terminal/CP of control portion 93 as a clock signal C30'. The clock signal C30' falls once for every two times that the transmission signal C30 from transfer control portion 21 falls. More specifically, the clock signal C30' falls to the "L" level every time two words pass data holding circuit 12. Control portion 93, in response to the fall of the clock signal C30', outputs inversion of the match signal/M applied to input terminal D as a control signal/BEN from inversion output terminal/Q. When the control signal/BEN is at the "H" level, transfer control portion 31a does not accept the transmission signal C32 from interface circuit 16. Transfer control portion 31a accepts the transmission signal C32 only when the control signal/BEN is at the "L" level. More specifically, when the identifier included in the first word D1 of the packet data matches the branching destination specifying bit BR, data holding circuit 22 transmits data only to data holding circuit 62. Conversely, if the identifier included in the first word D1 of the packet data does not match the branching destination specifying bit BR, data holding circuit 22 transmits the data to both data holding circuit 32 and data holding circuit 62. In the initial state, if a master reset signal/MR of an "L" level is applied to the reset terminal/R of control portion 93, the control signal/BEN attains the "H" level. In the initial state, data holding circuit 22 is therefore connected only to data holding circuit 62.

When the transmission acknowledging signal AK31 of the "H" is applied from interface circuit 85, transfer control portion 21, in response to a fall of the transmission signal C20, applies the transmission signal C30 of the "L" level to data holding circuit 22 through buffer 23. Transfer control portion 21 applies the transmission signal C30 in a path in the order of buffer 23, interface circuit 85, and interface circuit 86 to transfer control portion 31a, and applies the transmission signal C30 in a path in the order of buffer 23, interface circuit 85, and interface circuit 87 to transfer control portion 61. Data holding circuit 22, in response to the fall of the transmission signal C30, latches the first word D1 of the packet data applied from data holding circuit 12 and outputs the same. The second word D2 of the packet data is similarly latched by data holding circuit 12 and output therefrom following the first word D1.

When the control signal/BEN is at the "H" level, the first word D1 of the packet data output from data holding circuit 22 is applied only to data holding circuit 62. This is called "branch". Transfer control portion 61, in response to a fall of the transmission signal C33, applies a transmission signal C70 of an "L" level to data holding circuit 62 and transfer control portion 71 through buffer 63. Data holding circuit 62, in response to the fall of the transmission signal C70, latches the first word D1 of the packet data applied from data holding circuit 22 and outputs the same. The second word D2 of the packet data is similarly latched by data holding circuits 22 and output therefrom. At that time, with the control signal BEN being held at the "H" level, the second word D2 of the packet data output from data holding circuit 22 is applied only to data holding circuit 62. The first word D1 of packet data output from data holding circuit 62 is similarly latched by data holding circuit 70 and output therefrom. The second word D2 of the packet data output from data holding circuit 22 is also similarly latched by data holding circuit 62 and output therefrom.

Conversely, when the control signal/BEN output from control portion 93 is at the "L" level, the first word D1 of the packet data output from data holding circuit 22 is applied to both data holding circuit 32 and data holding circuit 62. This is called a "shunting point". The first word D1 of the packet data applied to data holding circuit 32 is latched by data holding circuit 32 and output therefrom, and then latched by data holding circuit 72 and output therefrom. Similarly, the first word D1 of the packet data applied to data holding circuit 62 is latched by data holding circuit 62 and output, and then latched by data holding circuit 72 and output therefrom. The second word D2 of the packet data is similarly applied to data holding circuit 32 and data holding circuit 62 through data holding circuit 22, and then applied to data holding circuit 42 and data holding circuit 72.

Interface circuit 85 latches a fall of the transmission signal C30 applied from transfer control portion 21, pulls the transmission signal C31 to the "L" level and pulls down the transmission acknowledging signal AK31 applied to transfer control circuit 21 to the "L" level (inhibited state). Thereafter, at the point when the transmission acknowledging signal AK30 applied from transfer control portion 31a and the transmission acknowledging signal AK60 applied from transfer control portion 61 both attain the "H" level, the transmission acknowledging signal AK31 to be applied to transfer control portion 21 is pulled to the "H" level (authorized state).

Interface circuit 86 and interface circuit 87 receive the transmission signal C31 from interface circuit 85. Interface circuits 86 and 87 have an identical structure to interface circuit 81 as described above, and shape the transmission signal C31 from interface circuit 85 into a transmission signal of a prescribed pulse width. A transmission signal C32 is output from interface circuit 86, and a transmission signal C33 is output from interface circuit 87.

Therefore, even when a time period for transferring a signal in the interconnection path between first information processing unit A and second information processing unit B is different from a time period for transferring a signal in the interconnection path between first information processing unit A and third information processing unit C, it is possible to autonomously adjust the timing skews of those signals in those interconnection paths, as well as it is possible to prevent the decrease of pulse width of the transmission signal, loss of the transmission signal and the effects of external noises, thereby ensuring data transmission as a result.

Figure 14:
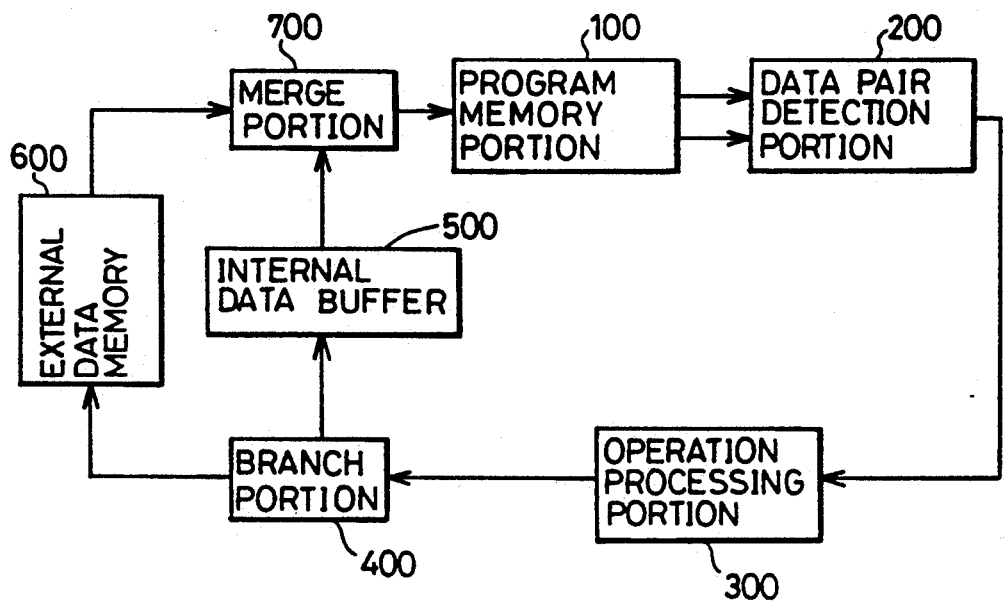
FIG. 14 is a block diagram showing a structure of a data flow type information processing unit to which an interface apparatus in accordance with the present invention is applied.
Figure 15:
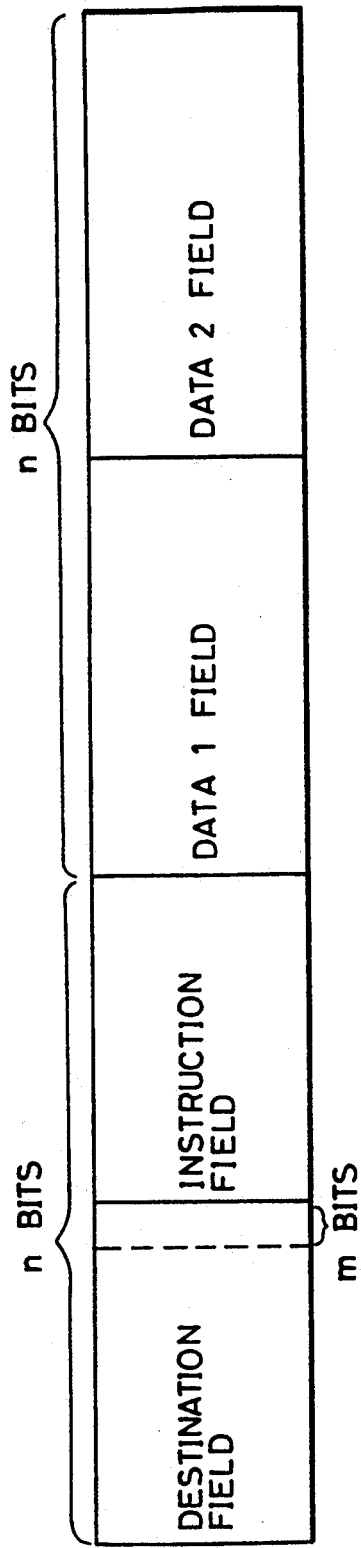
FIG. 15 is a diagram showing a structure of data packet cycling in each portion of the data flow type information processing unit shown in FIG. 14.

The interface apparatus in the embodiment as described above is for example applied to data transmission between a plurality of data flow type information processing units. FIG. 14 is a block diagram showing an example of a structure of such a data flow information processing unit. FIG. 15 is a diagram showing an example of a field structure of the packet of data processed by such an information processing unit.

Referring to FIGS. 14 and 15, the structure and operation of the data flow type information processing unit will be briefly described. Destination information is stored in the designation field of data packet shown in FIG. 15, instruction information is stored in the instruction field, and operand data is stored in the data 1 field or data 2 field. The destination field and instruction field correspond to the first word D1 shown in FIG. 13, while the data 1 field and data 2 field correspond to the second word D2 shown in FIG. 13. The identifier of m bits shown in FIG. 13 is included in the destination information.

Figure 16:
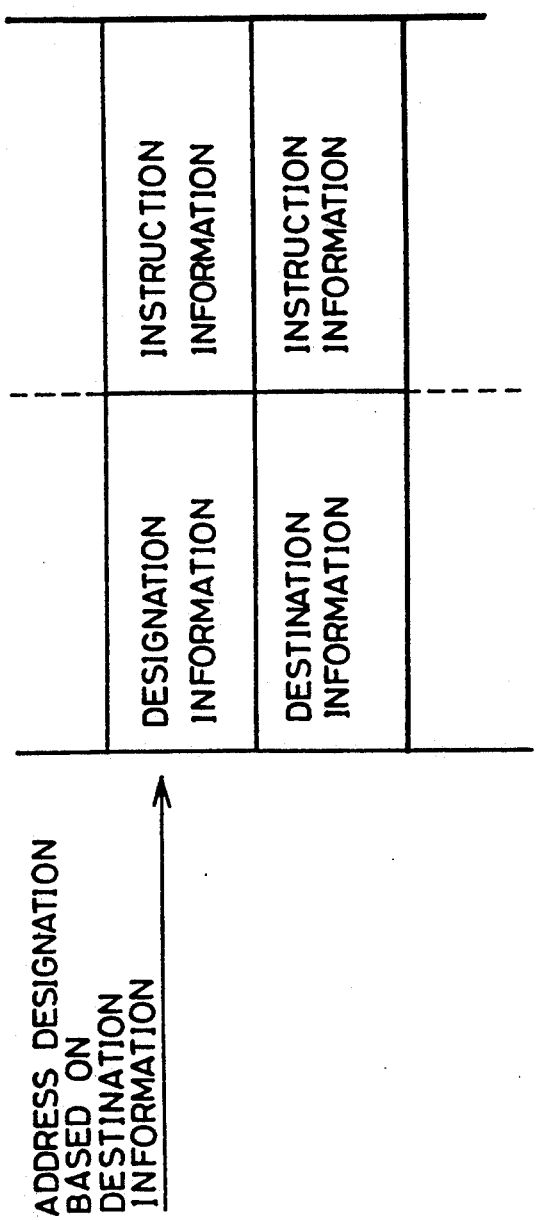
FIG. 16 is a representation showing a data program stored in a program storage portion in the data flow type information processing unit shown in FIG. 14.

In FIG. 14, a program memory portion 100 includes a program memory (not shown), in which, as shown in FIG. 16, a data flow program formed of plural pieces of destination information and plural pieces of instruction information. Program memory portion 100 reads destination information and instruction information in accordance with an address designation based on the destination information of the data packet, stores these pieces of information in the destination field and instruction field of the data packet, and outputs the data packet.

A pair data detection portion 200 queues the data packet output from program memory portion 100. More specifically, data pair detection portion 200 detects two data packets having the same destination information, stores the operand data of one data packet in a prescribed data field of the other data packet, and outputs the other data packet. At that time, the above-described one data packet disappears.

An operational processing portion 300 decodes the instruction information of the data packet output from data pair detection portion 200, conducts a prescribed operational processing to these two pieces of operand data, stores the result in the data field of the data packet, and outputs the data packet to a branch portion 400.

Branch portion 400 based on the destination information of the data packet outputs the data packet to an internal buffer 500 or an external data memory 600. The data packets output from internal data buffer 500 and external data memory 600 are supplied to a merge portion 700, and merge portion 700 applies these data packets to program memory portion 100 in the order of arrival.

In the data flow type information processing unit shown in FIG. 14, the data packets circle through program memory portion 100, data pair detection portion 200, operation processing portion 300, branch portion 400, internal data buffer 500 or external data memory 600, and merge portion 700, and, therefore, an operational processing proceeds based on a program stored in program memory portion 100.

The interface apparatus of the above-described embodiment is, for example, provided between the branch portion of one data flow type information processing unit and the merge portion of the other data flow type information processing unit.

The interface apparatus of the present invention is not only limited to application to data transmission between data flow type information processing units, but can also widely be applicable to data transmission between various information processing units and data transmission between the other apparatuses.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interface apparatus for controlling data transmission from a first apparatus to at least one second apparatus, wherein
   said first apparatus outputs a first state signal indicating the transmission state of data at the time of data transmission to said at least one second apparatus, and
   said at least one second apparatus outputs a second state signal to said first apparatus for indicating a state of reception completion when a reception of data from said first apparatus is completed,
   said interface apparatus comprising:
   transmission inhibiting signal generation means responsive to said first state signal from said first apparatus for applying, to said first apparatus, a transmission inhibiting signal to inhibit transmission of further data,
   state signal holding means responsive to said second state signal from said at least one second apparatus for holding said first state signal and for outputting the first state signal which said holding means has been holding to said at least one second apparatus; and
   transmission acknowledging signal generation means responsive to the second state signal from said at least one second apparatus for applying to said first apparatus a transmission acknowledging signal to authorize transmission of further data in place of said transmission inhibiting signal.

2. An interface apparatus as recited in claim 1, wherein
   said first apparatus includes first data transmission means for conducting handshaking type data transmission,
   said at least one second apparatus includes second data transmission means for conducting handshaking type data transmission, and
   said state signal holding means includes waveform shaping means for shaping the waveform of said first state signal so that said at least one second apparatus can receive the signal.

3. An interface apparatus for controlling transmission of data from a first apparatus to a plurality of second apparatuses, wherein
   said data includes an identifier for specifying at least one of said plurality of second apparatuses,
   said first apparatus outputs a first state signal for indicating the transmission state of data at the time of data transmission to said plurality of second apparatuses, and
   each of said plurality of second apparatuses outputs a second state signal for indicating a state of reception completion when a data reception from said first apparatus is completed,
   said interface apparatus, comprising:
   determination means for determining whether said identifier included in the data applied from said first apparatus specifies any or all of said plurality of second apparatuses and outputting a signal indicating the determination result,
   control means responsive to said signal from said determination means for transmitting the data from said first apparatus to any or all of said plurality of second apparatuses;
   transmission inhibiting signal generation means responsive to said first state signal from said first apparatus for applying, to said first apparatus, a transmission inhibiting signal to inhibit transmission of further data;
   state signal holding means responsive to said second state signal from said plurality of second apparatuses for holding said first state signal and outputting the first state signal which said holding means has been holding to said plurality of second apparatuses, and transmission acknowledging signal generation means responsive to a second state signal generated last among said second state signals from said plurality of second apparatuses for applying to said first apparatus a transmission acknowledging signal to authorize transmission of further data in place of said transmission inhibiting signal.

4. An interface apparatus as recited in claim 3, wherein said first apparatus includes first data transmission means for conducting handshaking type data transmission, each of said plurality of second apparatuses includes second data transmission means for conducting handshaking type data transmission, and said state signal holding means includes waveform shaping means for shaping the waveform of said first state signal so that the signal can be received by said plurality of second apparatuses.

5. An interface apparatus as recited in claim 3, wherein said data is formed of a plurality of words to be transmitted successively, further comprising:

word number counting means for counting a number of words to be transmitted from said first apparatus to any of said plurality of second apparatuses and allowing control of said control means to be maintained until the plurality of words included in one piece of data is transmitted.

6. An interface apparatus as recited in claim 5, wherein said control means includes switching means provided between said first apparatus and any of said plurality of second apparatuses and responsive to said signal applied from said determination means for selectively becoming conductive or non conductive.

7. An interface apparatus provided between a plurality of data flow type information processing units in which an operational processing is conducted by sequentially transmitting data to a plurality of processing portions in accordance with a data flow program, wherein one of said information processing units outputs a first state signal for indicating the transmission state of data at the time of data transmission to at least one other of said information processing units, and any of said at least one other information processing units outputs a second state signal for indicating a state of reception completion when a data reception from said one information processing unit is completed, said interface apparatus comprising:

transmission inhibiting signal generation means responsive to said first state signal from said one information processing unit for applying, to said one information processing unit, a transmission inhibiting signal to inhibit transmission of further data;

state signal holding means responsive to said second state signal from any of said at least one other information processing units for holding said first state signal and outputting said first state signal which said holding means has been holding to said at least one other information processing units; and transmission acknowledging signal generation means responsive to a second state signal generated last among said second state signals from said at least one other information processing units for generating a transmission acknowledging signal to authorize transmission of further data in place of said transmission inhibiting signal.

* * * * *